(12) United States Patent
Turek et al.

(10) Patent No.: US 6,404,909 B2
(45) Date of Patent: *Jun. 11, 2002

(54) METHOD AND APPARATUS FOR PROCESSING PARTIAL LINES OF SCANNED IMAGES

(75) Inventors: Matthew W. Turek; Matthew E. Ellis, both of Waukesha, WI (US)

(73) Assignee: General Electric Company, Schenectady, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/116,683

(22) Filed: Jul. 16, 1998

(51) Int. Cl.$^7$ .................................................. G06K 9/00
(52) U.S. Cl. ........................ 382/132; 382/128; 382/100
(58) Field of Search ............................... 358/444, 445, 358/474; 382/132, 124, 298, 202, 323, 128, 100; 128/922; 356/39

(56) References Cited

U.S. PATENT DOCUMENTS

| | | | |
|---|---|---|---|
| 5,067,019 A | * 11/1991 | Juday et al. | 358/160 |
| 5,077,810 A | 12/1991 | D'Luna | 382/41 |
| 5,113,453 A | * 5/1992 | Simon | 382/24 |
| 5,117,295 A | 5/1992 | Smith | 358/474 |
| 5,164,996 A | * 11/1992 | Pastor | 382/25 |
| 5,221,971 A | * 6/1993 | Allen et al. | 358/459 |
| 5,359,694 A | 10/1994 | Concordel | 358/445 |
| 5,440,406 A | 8/1995 | Sugino | 358/444 |
| 5,487,118 A | * 1/1996 | Melen | 382/202 |
| 5,487,172 A | * 1/1996 | Hyatt | 395/800 |
| 5,537,484 A | * 7/1996 | Kobayashi | 382/124 |
| 5,717,793 A | * 2/1998 | Ushida et al. | 382/298 |
| 5,734,915 A | * 3/1998 | Roewer | 395/773 |
| 5,949,409 A | * 9/1999 | Tanaka | 345/186 |
| 5,966,116 A | * 10/1999 | Wakeland | 345/126 |
| 5,966,463 A | * 10/1999 | Wang | 382/202 |

FOREIGN PATENT DOCUMENTS

EP    B1 342 022 A2    11/1989    ............ G09G/1/16

* cited by examiner

*Primary Examiner*—Leo Boudreau
*Assistant Examiner*—Barry Choobin
(74) *Attorney, Agent, or Firm*—Fletcher, Yoder & Van Someren

(57) ABSTRACT

Partial lines of data representative of adjacent pixels in an image pixel matrix are reordered to facilitate reconstitution of a scanned image. The partial lines are received by a signal processing circuit and are assigned unique addresses by reference to base address and offset values. Each partial line is then stored in a memory address corresponding to the assigned address. The values of the base addresses and offsets may be altered to accommodate different image matrix sizes and scanning patterns.

20 Claims, 3 Drawing Sheets

FIG. 4

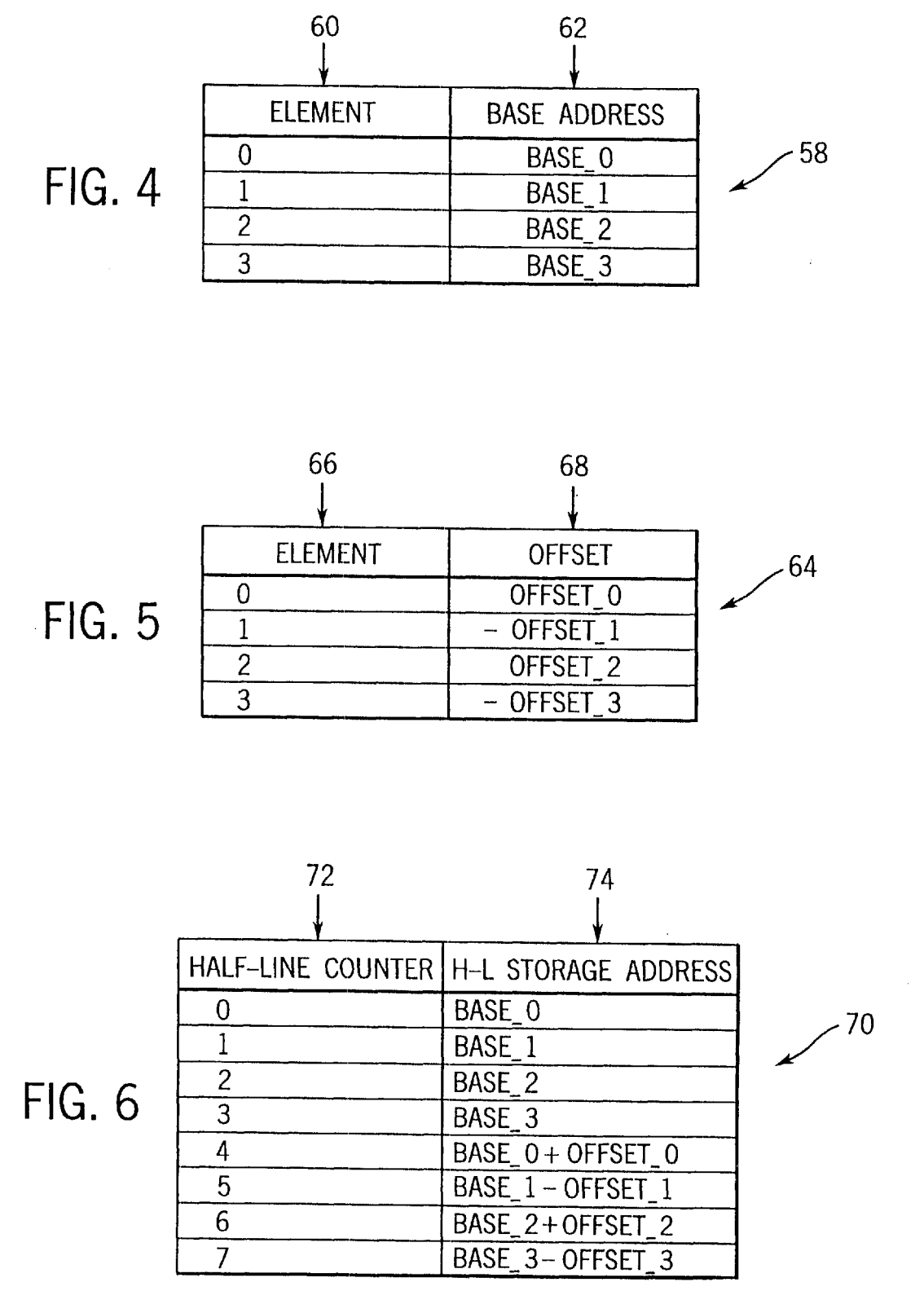

| ELEMENT | BASE ADDRESS |
|---|---|
| 0 | BASE_0 |
| 1 | BASE_1 |
| 2 | BASE_2 |
| 3 | BASE_3 |

FIG. 5

| ELEMENT | OFFSET |
|---|---|
| 0 | OFFSET_0 |
| 1 | − OFFSET_1 |
| 2 | OFFSET_2 |
| 3 | − OFFSET_3 |

FIG. 6

| HALF-LINE COUNTER | H-L STORAGE ADDRESS |
|---|---|
| 0 | BASE_0 |
| 1 | BASE_1 |
| 2 | BASE_2 |
| 3 | BASE_3 |
| 4 | BASE_0 + OFFSET_0 |
| 5 | BASE_1 − OFFSET_1 |
| 6 | BASE_2 + OFFSET_2 |
| 7 | BASE_3 − OFFSET_3 |

METHOD AND APPARATUS FOR PROCESSING PARTIAL LINES OF SCANNED IMAGES

TECHNICAL FIELD

This invention relates to the processing of sequences, particularly partial lines of an image, such as X-ray images, and, more particularly, to a technique for converting half-lines of image pixel data to full-lines for subsequent processing and display.

BACKGROUND ART

Images generated by X-ray and other imaging systems are acquired in a variety of manners, depending upon the structure and configuration of the detecting subsystems. In general, a detector is employed for receiving image information divided into a matrix of pixels, which, together, define an overall image of interest. The matrix of pixels is commonly divided into rows which are scanned and analyzed sequentially or in a pre-established sequential pattern. The rows of pixels are then reassembled by processing circuitry to reconstitute the useful image, which may be displayed or printed for use by an attending physician or technician.

Various scanning formats and matrix sizes are commonly employed in X-ray and other image processing modalities. In a number of these techniques, the overall image is not only divided into rows of pixels, but each row is further subdivided into half-lines of pixels. For efficient processing of the image data, the half-lines of pixels may be detected and processed in various orders. For example, in a given matrix of image pixels, half-lines of pixel data may be acquired and processed beginning at upper and lower outer edges of the image and proceeding toward a center line of the image parallel to the half-lines of pixels. In other processing techniques, half-lines of pixel data may be processed from a center line of the overall image matrix, proceeding towards upper and lower edges. Moreover, half-lines of pixel data may also be acquired and processed progressively in sequential half-lines beginning at an upper corner of the image and continuing to an opposite lower corner.

Depending upon the pixel data acquisition sequence utilized, pixel data processed by the imaging system may arrive to signal processing circuitry in interlaced half-lines of data which must be sorted to produce a meaningful image. In particular, where alternating half-lines of data arrive from opposite upper and lower portions of an image, the half-lines of data must be sorted and grouped into adjacent full-lines proceeding from one side of the image to the other. In addition, the full-lines are arranged from an upper or lower edge of the image to the opposite edge to reproduce the arrangement of the pixels representative of the body or object scanned.

In addition to the sorting and reassociation functions performed on interlaced half-lines of image data, it is sometimes desirable to produce scanned image data having different matrix dimensions (i.e., rows of pixels by columns of pixels), depending upon the type of feature being imaged and the detail desired. Accordingly, circuitry employed for processing and sorting half-lines of pixel data would advantageously accommodate the variety of matrix formats envisioned.

DISCLOSURE OF THE INVENTION

In an exemplary embodiment, the invention provides an approach to sorting partial or half-lines of image data produced by an imaging detector. The half-lines of data are received by processing circuitry and are assigned memory storage addresses. The memory storage addresses for each half-line of data are determined by a half-line counter with reference to a base address table. Values corresponding to output locations are stored in the base address table. The values are changed by reference to offsets. As the half-line counter is incremented for sequentially received half-lines of data, the memory addresses in which the data are stored are determined uniquely, by reference to the base address table and offsets. The resulting sequence of storage addresses orders the half-lines of data to associate the data into sequential full-lines for reconstitution of the scanned image.

The technique facilitates the use of various scan modes and matrix sizes. By altering the base addresses and offsets used to generate the output memory address locations, various scanning modes may be employed, including outside-to-inside scanning and inside-to-outside scanning. Moreover, by setting the proper values in the base address table and by using appropriate offsets, a variety of pixel matrix dimensions may be accommodated by the same system, in a computationally efficient manner.

BRIEF DESCRIPTION OF THE DRAWINGS

FIG. 4 is a base address table for assigning base addresses to half-lines of image data for the image illustrated in FIG. 2;

FIG. 5 is an offset table for applying relevant offsets to the base addresses of the table of FIG. 4;

FIG. 6 is an output memory address location table generated by reference to the base address table of FIG. 4 and the offset table of FIG. 5 for re-ordering the half-lines of image data from the scanned order of FIG. 2 to the order represented in FIG. 3.

BEST MODE FOR CARRYING OUT THE INVENTION

Figure 1:
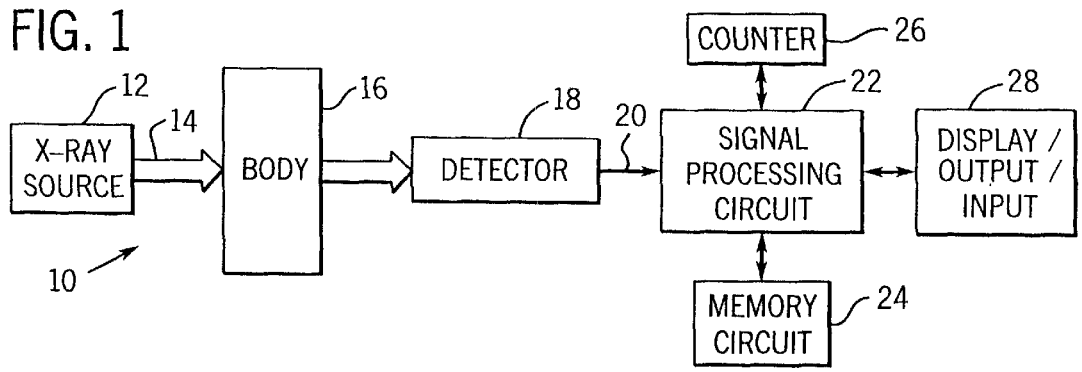
FIG. 1 is a diagrammatical representation of an X-ray imaging system including circuitry for acquiring and processing half-lines of image data.

Referring now to FIG. 1, the primary components of an imaging system 10 are illustrated as including an X-ray source 12 which is configured to emit a stream 14 of X-rays upon demand. The X-rays are directed to a body or subject 16. A portion of the X-rays pass through the body and impact a detector 18. Detector 18 is configured to isolate discrete picture elements or pixels and to generate signals representative of the intensity of the radiation impacting the detector within each pixel. These signals are transmitted from detector 18 as a data stream, represented by reference numeral 20, to a signal processing circuit 22.

Signal processing circuit 22 conditions the data received from detector 18, and refines the data to produce ordered data which can be interpreted by an attending physician or technician. Signal processing circuit 22 is coupled to a memory circuit 24 which, for the present purposes, serves to store partial lines of data for reconstitution of the image. Signal processing circuit 22 is also coupled to a counter 26 which aids in reordering data received from detector 18 as summarized below. A display/output/input station 28, typically including a monitor or printer and an input station, such as a keyboard, is coupled to signal processing circuit 22 for producing a reconstituted image which is available for interpretation by the attending physician or technician. The physician or technician may also input operational parameters into circuit 22 via station 28, such as the image matrix size and scanning pattern as discussed below. In general, such parameters may be input by selection of an image or application type or of a general examination configuration. It should be noted that signal processing circuit 22 and counter 26 may be defined as appropriate code in a general purpose or application-specific microprocessor or computer. Moreover, signal processing circuit 22 may perform functions in system 10 in addition to those described below, such as image processing, analysis and enhancement functions.

Figure 2:
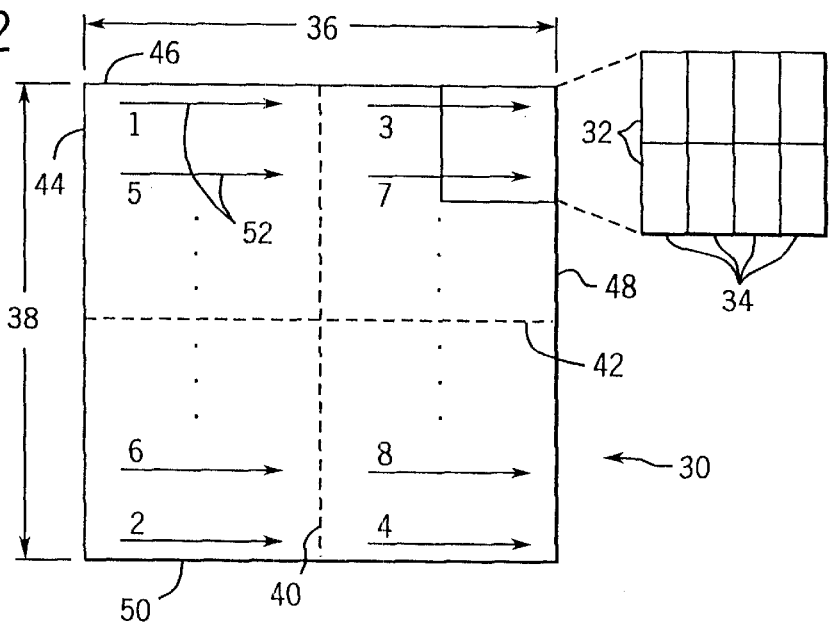
FIG. 2 is a diagrammatical representation of an X-ray image divided into half-lines of pixel data in accordance with an outside-to-inside scan mode.

FIG. 2 illustrates an image generated by system 10 in the form of an image pixel matrix 30. Matrix 30 includes a series of discrete pixels arranged in parallel rows 32 and parallel columns 34. The rows and columns of pixels form an overall image having a width 36 and a height 38. The particular dimensions of matrix 30 may be varied depending upon the type of tissue or subject being scanned, and the types of features of interest within the image. For example, matrix 30 may have dimensions of 2,048 pixels by 2,048 pixels as a standard format, or may have a smaller format 1,024 pixels by 1,024 pixels, such as for cardiac radiographs, or still different dimensions, such as 1920 pixels by 2304 pixels for mammograms.

In addition to accommodating various matrix or image sizes, system 10 may be configured to scan pixel data collected by detector 18 in various modes. In particular, the modes may subdivide matrix 30 into regions defined by a vertical center line 40 and a horizontal center line 42. Within these regions, scanning may progress in accordance with the predefined modes. For example, in the embodiment illustrated in FIG. 2, scanning begins at a left edge 44, adjacent to an upper edge 46. Scanning then progresses from left edge 44 in the direction of a right edge 48. Subsequent data is scanned beginning from left edge 44, adjacent to a lower edge 50, proceeding from left edge 44 in the direction of right edge 48. The information scanned within the regions defined by the edges and the center lines form half-lines of pixel data, designated by reference numeral 52 in FIG. 2. Each half-line of pixel data includes signals or values representative of the intensities within adjacent pixels in a row across matrix 30.

In one scanning mode illustrated in FIG. 2, which may be referred to as an outside-to-inside scanning mode, a first half-line of pixel data, designated "1" is scanned in an upper left position in matrix 30. The subsequent half-line of pixel data, designated "2" extends along a lower left corner of matrix 30. Due to the configuration of detector 18, the subsequent half-line "3" of pixel data extends from center line 40, adjacent to upper edge 46, toward right edge 48. Next, a half-line "4" of pixel data is scanned from center line 40 adjacent to lower edge 50, in the direction of right edge 48. In this mode, scanning proceeds in accordance with the foregoing order until the rows of matrix 30 adjacent to horizontal center line 42 have been scanned.

It should be noted that the information received from detector 18 by signal processing circuit 22 may not only include interlaced half or partial-lines of pixel data, but may include data in which pixels of partial lines are further interlaced. However, the technique described below proceeds based upon partial-lines in which individual pixels have been pre-sorted to form contiguous sequences or series of pixel data defining half-lines, or more generally, partial-lines. Moreover, it should be noted that the technique described herein is not limited to the particular scanning sequence illustrated in FIG. 2. Rather, the technique may be applied to partial-lines of pixel data scanned in both symmetrical and asymmetrical patterns, and in outside-to-inside sequences, inside-to-outside sequences, or in progressive scanning sequences. The particular scanning mode or sequence, and the particular matrix size may be configured as parameters recognizable by signal processing circuit 22 which may be input by an operator or technician via display/output/input station 28 (such as by selection of an image or examination type as mentioned above).

Figure 3:
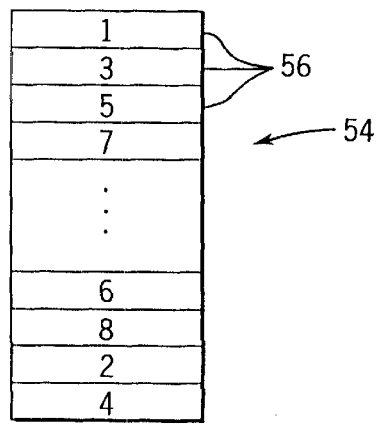
FIG. 3 is a diagrammatical representation of a re-ordered sequence of half-line data for the image of FIG. 2, properly sorted to reconstitute the image.

Referring again to FIG. 2, depending upon the scanning sequence selected, it will be apparent that the partial-lines of pixel data received by signal processing circuit 22 will not correspond to the proper ordering of the data in a reconstituted image matrix 30. To permit the data to be reordered for presentation in a reconstituted image, signal processing circuit 22, in conjunction with memory circuit 24 and counter 26, organizes the partial-lines of data in an appropriate sequence as illustrated in FIG. 3. This reordered sequence 54 may be conveniently configured in memory circuit 24 by assigning unique addresses 56 to the individual partial-lines of data. The sequence 54 illustrated in FIG. 3 corresponds to the appropriately ordered half-lines of pixel data illustrated in the scanning sequence of FIG. 2. The reordered sequence thus permits contiguous full lines of pixel data to be defined for subsequent processing and display.

FIGS. 4, 5, and 6 illustrate an exemplary technique employed by signal processing circuit 22 for reordering the half-lines of pixel data of FIG. 2 into the desired sequence 54 of FIG. 3. In particular, FIG. 4 represents a base address table 58 stored within memory circuit 24. Base address table 58 includes data associating specific element numbers 60 to base addresses 62. FIG. 5 represents an offset table 64, also stored within memory circuit 24, and associating element numbers 66 with offset values 68. FIG. 6 represents a half-line storage address table 70, generated by reference to base address table 58 and offset table 64 as described below.

Figure 7:
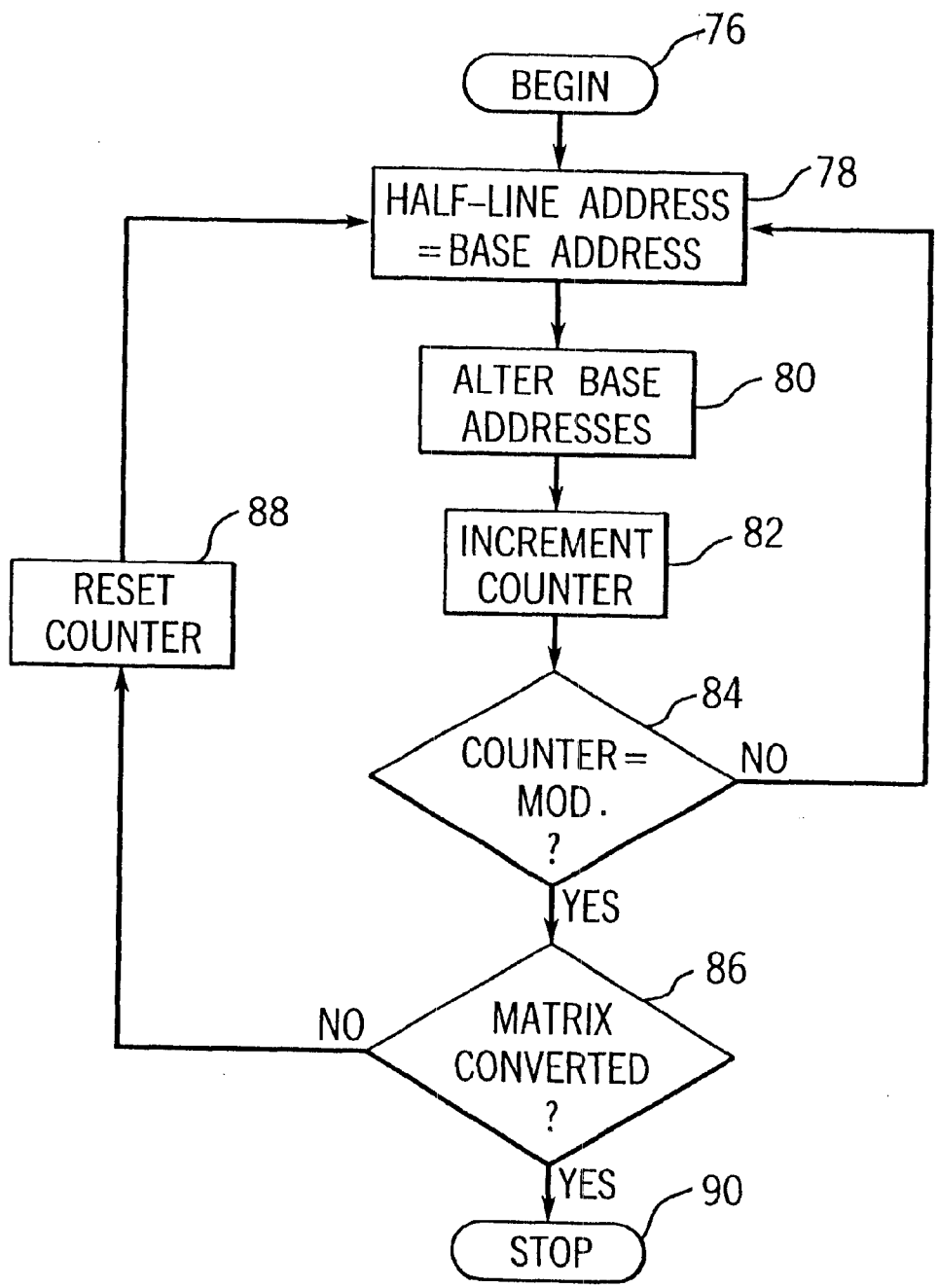
FIG. 7 is a flow chart illustrating exemplary control logic for reordering partial-lines of image pixel data for subsequent storage and processing.

To determine the half-line storage addresses 74 of table 70, signal processing circuit 22 executes control logic designed to assign unique addresses to each partial-line of image data. This logic may proceed by combining the base storage addresses of table 58 with offsets of table 64. Exemplary steps in such control logic are illustrated in FIG. 7. As shown in FIG. 7, the control logic begins at step 76 and proceeds to step 78 where the first half-line storage address is assigned to the first element by setting the half-line storage address equal to the corresponding base address of table 58. Hence,. the first half-line storage address receives a value of BASE__0.

Thereafter, circuit 22 proceeds to step 80 where the assigned value from the base address table 58 is altered by combining the original base address with an offset of table 64. In the illustrated embodiment, programming code may be provided to reassign each base address value 62 a new value corresponding to the previous value plus the offset for the corresponding element found in table 64. Thus, following step 80, in the illustrated embodiment, as elements 0-3 of table 58 are assigned to data, these will be sequentially altered to contain values of BASE__0+OFFSET__0, BASE__1−OFFSET__1, BASE__2+OFFSET__2, and BASE__3−OFFSET__3, respectively.

Following step 80, counter 26 is incremented as illustrated at step 82. At step 84 signal processing circuit 22 determines whether the counter value has reached a predetermined modulus value. In the illustrated example, a modulus value of 4 is used due to the four quadrants defined by center lines 40 and 42 in matrix 30 (see FIG. 2). So long as the counter value has not reached the modulus value, circuit 22 returns to step 78 to assign the next base address value from table 58 to the subsequent half-line of pixel data.

Once the modulus value is attained by the counter 26, circuit 22 proceeds to step 86 where it is determined whether the entire matrix has been converted. This step may be performed by reference to half-line counter values as denoted by reference numeral 72 in FIG. 6. The total number of half-line counter values will correspond to the number of partial lines within the image matrix 30, in turn dependent upon the dimensions 36 and 38 of the matrix (see FIG. 2) and the selected scanning mode or sequence.

When the response at step 86 is negative, circuit 22 proceeds to step 88 where counter 26 is reset. Thereafter, circuit 22 returns to step 78 to assign the next group of half-line pixel data the altered addresses then stored in table 58. This control logic proceeds until the entire matrix 30 has been converted, and is thereafter exited, as noted at step 90.

Although half-line storage addresses 74 may be associated with the pixel data to provide for reordering of the data, each set of pixel data is preferably stored in the memory circuit 24 in an address location corresponding to that dictated by table 70. It should also be noted that, while the foregoing technique reference has been made to tabulated data, those skilled in the art will readily appreciate that the addresses, offsets and resulting storage addresses could either be embodied in look-up tables as described, or could be embedded in appropriate code executed by signal processing circuit 22.

Those skilled in the art will also recognize that by altering the base address and offset values utilized in determining the half-line storage addresses, the present technique can easily be adapted to accommodate various image matrix dimensions, as well as various scanning modes, including both inside-to-outside sequences and outside-to-inside sequences. Moreover, the technique provides a particularly computationally efficient system wherein contiguous full lines of pixel data can be obtained in real-time as the half-lines of data are transmitted to the signal processing circuitry. The system is easily reconfigurable by inputting specific matrix size selections and scanning mode selections via display/output/input station 28.

What is claimed is:

1. A method for processing partial lines of image data from a detector, each partial line of data representing a portion of an image pixel matrix, the method comprising the steps of:
    (a) receiving partial lines of image data in a first data sequence;
    (b) assigning to each partial line of image data in a first series a position in a second data sequence by reference to a plurality of base addresses;
    (c) altering the base addresses; and
    (d) assigning to each partial line of image data in a second series a position in the second data sequence by reference to the altered base addresses.

2. The method of claim 1, wherein positions of each partial line of image data in the second data sequence corresponds to an address in a memory circuit.

3. The method of claim 1, wherein the base addresses are generated as a function of pixel dimensions of the image pixel matrix.

4. The method of claim 1, wherein the base addresses are altered by reference to offset values stored in a memory circuit.

5. The method of claim 4, wherein the offset values are generated as a function of pixel dimensions of the image pixel matrix and the first data sequence.

6. The method of claim 1, wherein the first data sequence corresponds to a scanning pattern of the image pixel matrix from peripheral edges of the matrix to an inner location thereof.

7. The method of claim 1, wherein the base addresses are altered as a function of dimensions of the image pixel matrix.

8. A method for processing a discrete pixel image, the image including a plurality of pixels disposed in an image pixel matrix, the method comprising the steps of:
    (a) determining address values based upon dimensions of the image pixel matrix and a desired pixel scanning data sequence;
    (b) generating a plurality of series of image data for pixels in the image pixel matrix; and
    (c) assigning to each series of image data a unique address value corresponding to a desired pixel output data sequence.

9. The method of claim 8, wherein the address values are determined by determining a plurality of base address values and a plurality of offset values based upon the dimensions of the image pixel matrix and on the desired pixel scanning data sequence.

10. The method of claim 9, wherein the base address values are stored in a base address table and the offset values are stored in an offset table.

11. The method of claim 9, wherein the base address values and the offset values are combined to determine address values for each series of image data in at least first and second groups.

12. The method of claim 11, wherein each series of image data is assigned an address value of the first group, and each subsequent series of image data is assigned an address value of the second group based upon a counter value.

13. The method of claim 8, wherein each series corresponds to a partial line of pixels in the image pixel matrix.

14. The method of claim 8, wherein the dimensions of the image pixel matrix are set by operator selection.

15. The method of claim 8, wherein the desired pixel scanning data sequence is set by operator selection.

16. An apparatus for processing partial lines of image data representative of discrete pixels in an image pixel matrix, the apparatus comprising:
    a first memory circuit for storing operator configurable address values corresponding to a desired data sequence of the partial lines of image data;
    a second memory circuit for storing the partial lines of image data in the desired data sequence; and
    a signal processing circuit configured to assign to each partial line of image data an address value from the first memory circuit, and to store the partial lines of image data in the second memory circuit according to the assigned address values.

17. The apparatus of claim 16, wherein the first memory circuit stores a plurality of base address values and offset values corresponding to a plurality of image pixel matrix dimensions.

18. The apparatus of claim 17, wherein the offset values are based on a predetermined image scanning data sequence.

19. The apparatus of claim 18, wherein offset values are stored in the first memory circuit based on a plurality of predetermined image scanning data sequences.

20. The apparatus of claim 16, further comprising a counter, the signal processing circuit being configured to increment the counter for each partial line of image data assigned an address value from the first memory circuit.

\* \* \* \* \*